United States Patent [19]
Hirt

[11] Patent Number: 5,656,346
[45] Date of Patent: Aug. 12, 1997

[54] PACKAGING TUBE

[75] Inventor: Hans Hirt, Laupen, Switzerland

[73] Assignee: KMK Lizence Ltd., Chaussee, Mauritius

[21] Appl. No.: 215,408

[22] Filed: Mar. 17, 1994

Related U.S. Application Data

[63] Continuation of Ser. No. 823,372, Jan. 21, 1992, abandoned.

[30] Foreign Application Priority Data

Jan. 21, 1991 [CH] Switzerland ............... 00 148/91

[51] Int. Cl.⁶ ..................................... B29D 23/00
[52] U.S. Cl. ............... 428/36.91; 428/36.9; 428/35.7; 222/107; 220/461; 220/DIG. 7; 206/277; 206/524.7
[58] Field of Search ................... 428/35.7, 36.9, 428/36.91, 36.6, 36.7, 480, 483, 500, 518; 222/107; 220/DIG. 7, 461; 206/277, 524.2

[56] References Cited

U.S. PATENT DOCUMENTS

| | | | |
|---|---|---|---|
| 3,047,910 | 8/1962 | Downs | 18/59 |
| 3,178,065 | 4/1965 | Auerswald | 222/107 |
| 3,958,721 | 5/1976 | Kushida et al. | 222/107 |
| 4,096,946 | 6/1978 | Cook et al. | 206/484.2 |
| 4,142,630 | 3/1979 | Hayes et al. | 206/277 |
| 4,254,169 | 3/1981 | Schroeder | 428/36.6 |
| 4,257,536 | 3/1981 | Hilmar | 222/107 |
| 4,483,891 | 11/1984 | Cerny | 428/36.7 |
| 4,528,219 | 7/1985 | Yamada et al. | 428/36.6 |
| 4,546,882 | 10/1985 | Hsu et al. | 206/484 |
| 4,595,612 | 6/1986 | Tavss et al. | 428/35 |
| 5,069,856 | 12/1991 | Holoubek et al. | 264/519 |
| 5,407,742 | 4/1995 | Tavss et al. | 428/34.2 |

*Primary Examiner*—James J. Seidleck
*Assistant Examiner*—Michael A. Williamson
*Attorney, Agent, or Firm*—Bachman & LaPointe, P.C.

[57] ABSTRACT

The invention concerns a packaging tube comprising a multi-layer pure plastic laminate and a sealing arrangement for tube heads for the packaging of materials with volatile substances such as flavouring or scent substances, which has a resistance to diffusion which is the same as or comparable to tubes which in their laminate structure have a metal layer as a diffusion barrier and which improves the recycling of tubes.

7 Claims, 3 Drawing Sheets

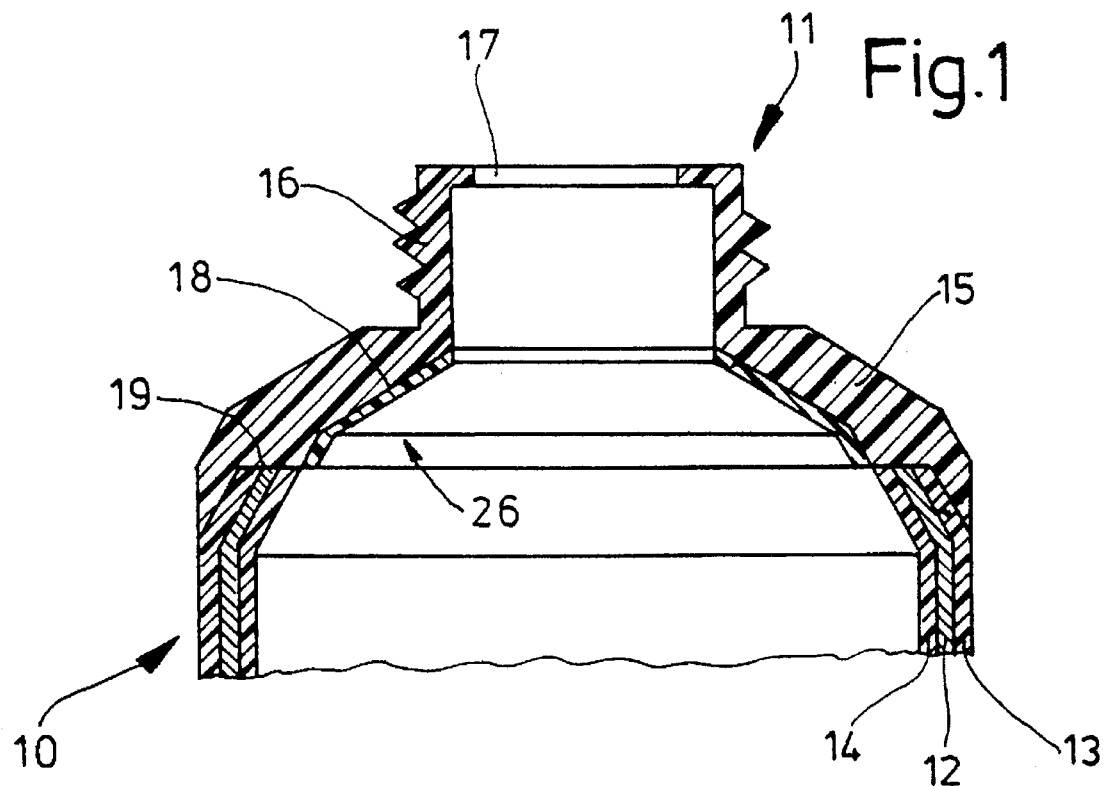
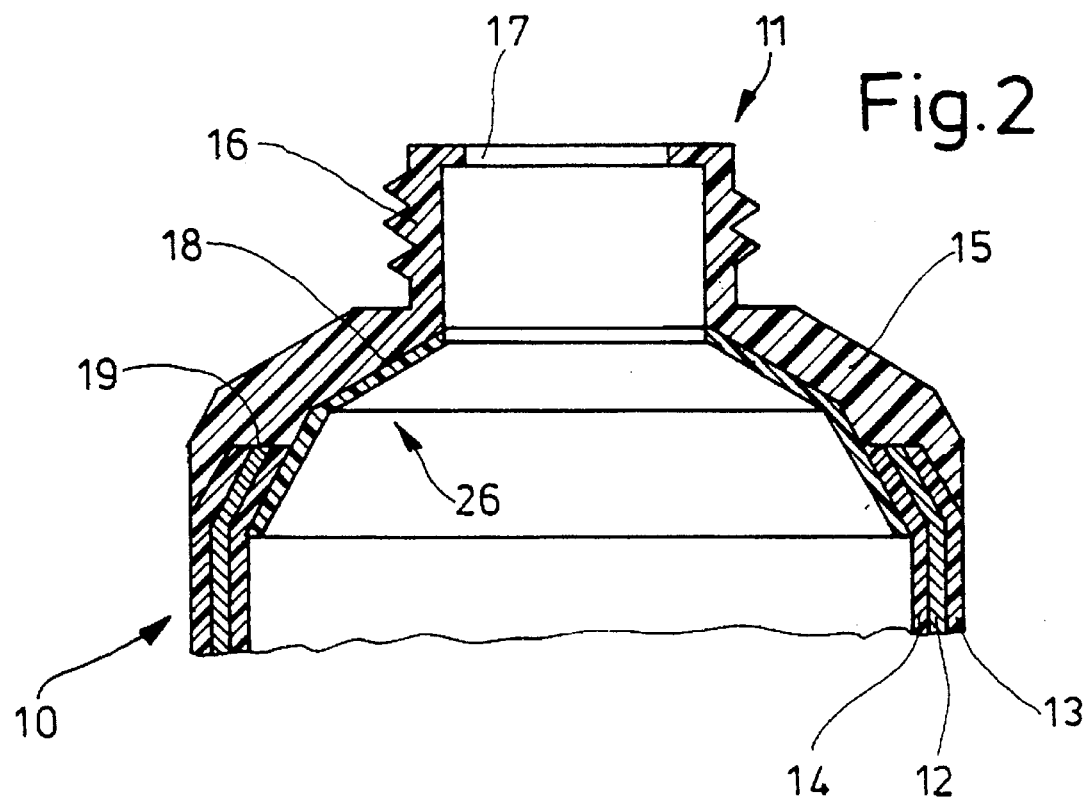

PACKAGING TUBE

This is a continuation of application Ser. No. 07/823,372 filed on Jan. 21, 1992.

BACKGROUND OF THE INVENTION

The invention relates to a packaging tube.

Packaging tubes are know, in which the tube body and the head portion comprise plastic material. The tube bodies are either extruded or are produced by rolling and overlappingly joining a single-layer plastic foil in endless form, to constitute a tube member (plastic tubes).The tube is cut into portions of the desired lengths to form the tube bodies and the tube bodies are provided at one end with a head portion to close the tube body. For the purposes of providing a tube body with a head portion, it is known to prefabricate head portions and to join them to the tube body by fusing them thereto. A further possible procedure is that of injection or press moulding the head portion,in which case the tube body is also joined to the head portion by being fused thereto, during the operation of forming the head portion. In regard to the plastic materials for the production of extruded tubes and the foils for making the rolled tubes,only plastic materials of such a composition or plastic material mixtures such that their melting characteristics are to be matched to the melting characteristics of the plastic materials of the head portions are to be used. It is due to the permeability of the plastic materials that tubes of those materials are not suitable for packaging materials with volatile, for example flavouring components,as the latter diffuse through the tube body and the head portion. Likewise the use thereof for the packaging of oils and greases is restricted.

For packaging materials which involve high levels of requirement, in the areas of foodstuffs, pharmaceuticals or hygiene matters, tubes with diffusion barriers have been developed to provide for protection in regard to flavouring or active substances, in respect of the packaging tubes. The tube bodies of such tubes are made from an aluminium-plastic laminate (metal-laminate tubes), for example an aluminium foil which is lined with plastic material on both sides and which forms the diffusion barrier after rolling and welding of the plastic layers. In order to eliminate the possibility of diffusion through the head portion, it is known for a covering of the same material as the tube body to be provided on the outer or inner surface of the head portion. Metal-laminate tubes of that kind provide reliable protection in regard to flavouring or active substance and the methods of manufacture thereof have attained a high technical status.

In contrast to plastic tubes, metal-laminate tubes are not readily recyclable. While plastic tubes can be re-processed to provide raw material again, by means of simple processes and without involving substantial losses of material, in the case of metal-laminate tubes two materials, namely the plastic material and the aluminium, first have to be separated from each other and processed separately. Melting down the plastic material, and its individual processing as well as melting the metal, are expensive and time-consuming operations. That expenditure on re-cycling is found to be a disadvantage with metal-laminate tubes.

SUMMARY OF THE INVENTION

On the basis of that consideration, the inventor set himself the problem of providing a packaging tube with a high degree of resistance to diffusion, with the simultaneous simple capacity for reprocessing to provide raw material, with a low level of material losses, that problem being solved in accordance with the invention by the features of the characterizing portion of claim 1.

By means of the foil material of the configuration according to the invention, for the tube body, in an advantageous development, in conjunction with the diffusion-inhibiting configuration of the head portion, there is provided a plastic laminate tube which, for demanding packaging materials, fulfils the same requirements in terms of durability and constancy in relation to flavouring or active substances, as metal laminate tubes, while at the same time avoiding the disadvantages thereof.

Further advantageous configurations of the tubes in accordance with the invention are set forth by means of the characterizing features of the claims following claim 1.

Further advantages, features and details of the invention will be apparent from the following description of preferred embodiments of tubes of a configuration in accordance with the invention, and the drawings in which:

BRIEF DESCRIPTION OF THE DRAWINGS

FIG. 1 a view in axial section of a first embodiment of a tube end with a plate-shaped disc in the shoulder portion of a tube head, FIG. 2 shows a further embodiment as illustrated in FIG. 1, in which the plate-shaped disc overlaps a front tube end.

DETAILED DESCRIPTION

Figure 3:
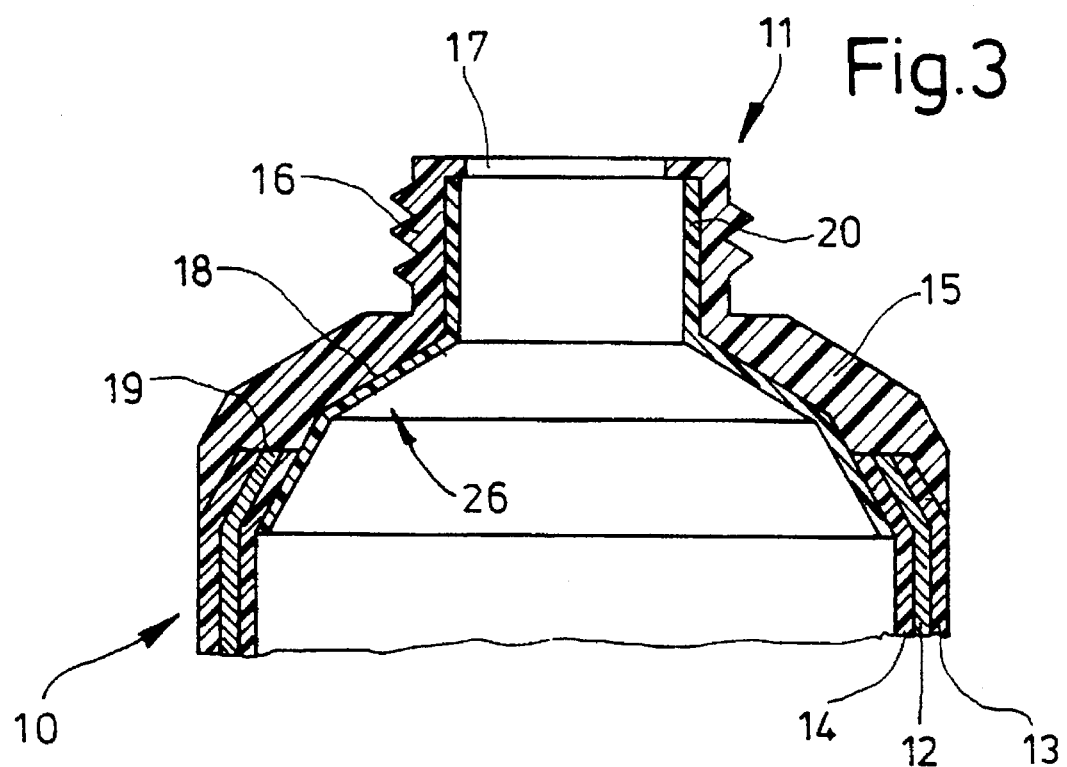
FIG. 3 shows a further embodiment as illustrated in FIG. 2, in which the plate-shaped disc has a hollow-cylindrical extension portion.

In FIGS. 1 to 5 (the same components are denoted by the same reference numerals in FIGS. 1 to 5), reference numeral 10 indicates tube body portions which are illustrated only in their end region which is towards the head thereof. The tube body portions 10 together with the heads generally identified by reference numeral 11 each form a respective part of a packaging tube. The tube bodies 10 are formed from a laminate comprising at least two plastic layers (plastic laminate tubes).

The tube body is preferably formed from a three-layer laminate. That laminate comprises a central layer which has a blocking effect, or barrier layer as indicated at 12, comprising EVAL (ethylene vinyl alcohol copolymer) or PETP (polyethylene terephthalate), lined on both sides with layers 13 and 14 of PE (polyethylene), wherein the PE may be an LDPE (Low Density Polyethylene), an HDPE (High Density Polyethylene), an LLDPE (Linear Low Density Polyethylene) or mixtures thereof. The layer 12 may be joined to the layers 13, 14 by means of bonded intermediate layers (not shown) of copolymers.

All types of polyethylene are distinguished for packaging purposes by good chemical resistance, a low level of absorption of water, a barrier action in relation to water vapour, a high degree of toughness, flexibility, in the temperature range of from −70° C. to +100° C., easy processability using all processes which are suitable for thermoplastic materials, and good weldability. In contrast, the comparatively high level of permeability of the polyethylenes in regard to oxygen, carbon dioxide, flavouring and scent substances are disadvantageous when they are used in the packaging area.

In comparison with the above-mentioned types of polyethylene, EVAL and PETP have comparable values in regard to chemical resistance, barrier action in relation to water vapour, absorption of water, toughness and flexibility; their processability and weldability are clearly worse. On the other hand, their levels of permeability in regard to oxygen, carbon dioxide, scent and flavouring substances are lower - far from adequate for high-grade packaging materials containing flavouring and scent substances, in accordance with the prevailing view, in comparison with the permeability of an aluminium barrier layer. Contrary to the prevailing view however it was surprisingly found that a tube body 10 comprising a three-layer PE/EVAL or PETP/PE composite material, for high-grade packaging materials, ensures the same or equivalent shelf lives (maximum storage times plus probable consumption time of a packaged material before falling below certain standards in terms of quality), as metal laminate tubes.

For the production of a tube body 10, it is advantageous to provide the layers 13 and 14 of polyethylene as the good weldability thereof guarantees the production of good sealed welded seams.

The head 11, which is also referred to as the head portion, is formed from a shoulder portion 15 and a discharge portion 16 with a discharge opening 17, wherein the discharge portion 16, on its outside surface, has engagement means for a tube closure, for example a screwthread. The head 11 comprises a plastic material which can be processed by means of injection moulding, preferably polyethylene.

When using the same material, the head 11 can also be formed by pressing a plasticised blank, by means of a press moulding procedure. The operation of bonding the tube body 10 and the operation of forming the head 11 are generally effected in one working step, in that, both in the injection moulding and in the press moulding procedures, tube bodies 10 are introduced at one end into injection or press moulds, the layers 13 and 14 are caused to melt by means of radiant heat, contact heat or outside heating, and they are joined in that condition to the heads which are being formed in the moulds.

Injection-moulded or press-moulded polyethylene has a higher degree of permeability for flavouring and scent substances, oxygen and carbon dioxide, than a multi-layer plastic foil. For that reason the head 11 is to be sealed off comparably to the tube body, for higher-grade packaging materials, in such a way as to be resistant to diffusion, in a development of the invention. For that purpose, as shown in FIGS. 1 to 5, there are provided diffusion-barrier means, in FIG. 1 for example in the form of a plate-shaped disc which bears against the side of the shoulder portion 15, which is towards the interior of the tube 11, and which extends at one end from the tube body end 19 and at the other end as far as the entry opening of the discharge portion 16. FIG. 2 shows an advantageous development of the configuration shown in FIG. 1. As illustrated therein, the plate-shaped disc 18 is of such a configuration that, at the one end, it projects beyond and covers over the tube body end 19 which is introduced into the shoulder portion 15, while at the other end it extends as far as the entry opening of the discharge portion 16. That overlapping arrangement provides for an enhanced sealing effect as between the plate-shaped disc 18 and the tube body end 19.

In the case of packaging materials which have a comparatively long shelf life, it has been found advantageous, in accordance with the invention, for the plate-shaped disc to be provided with a hollow-cylindrical extension portion 20, as shown in FIG. 3, wherein the outside surface of the extension portion 20 is in engagement with the inside surface of the hollow-cylindrical discharge portion 16, completely covering over that surface.

Figure 4:
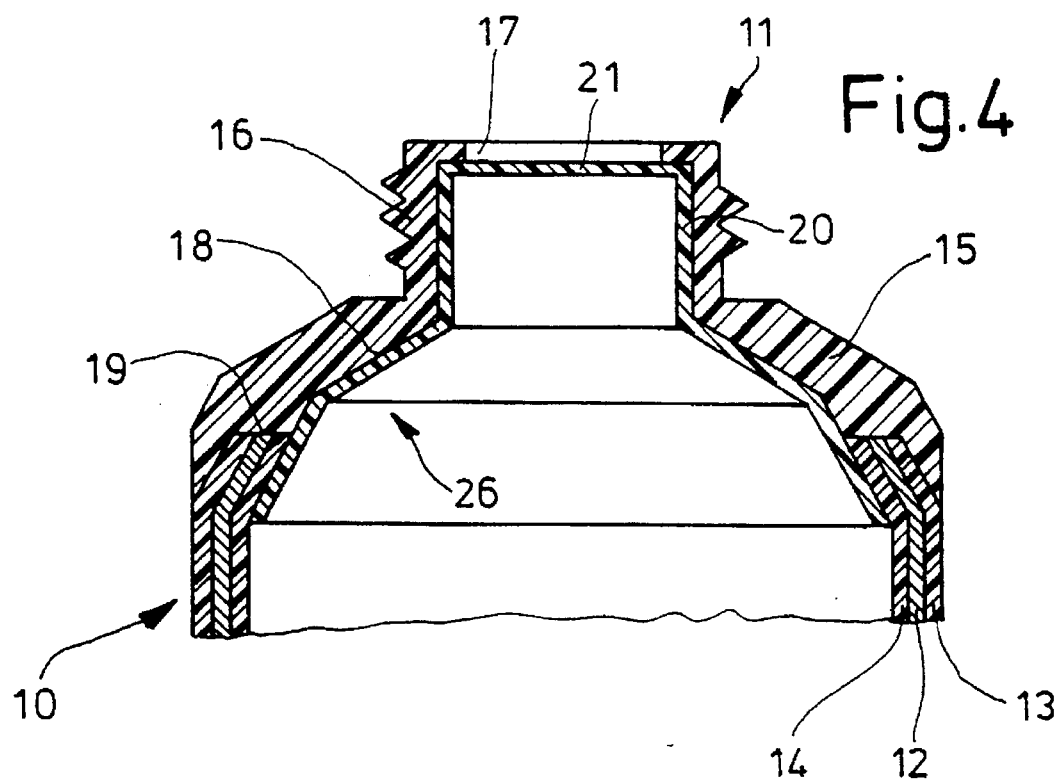
FIG. 4 shows a further embodiment as illustrated in FIG. 3, wherein the hollow-cylindrical extension portion is provided with a closure diaphragm.

In another advantageous embodiment of the invention, as shown in FIG. 4, the hollow-cylindrical extension portion 20 is provided with a closure diaphragm 21 which covers the entrance of the discharge opening 17 and which is to be cut out before the tube is used.

Figure 5:
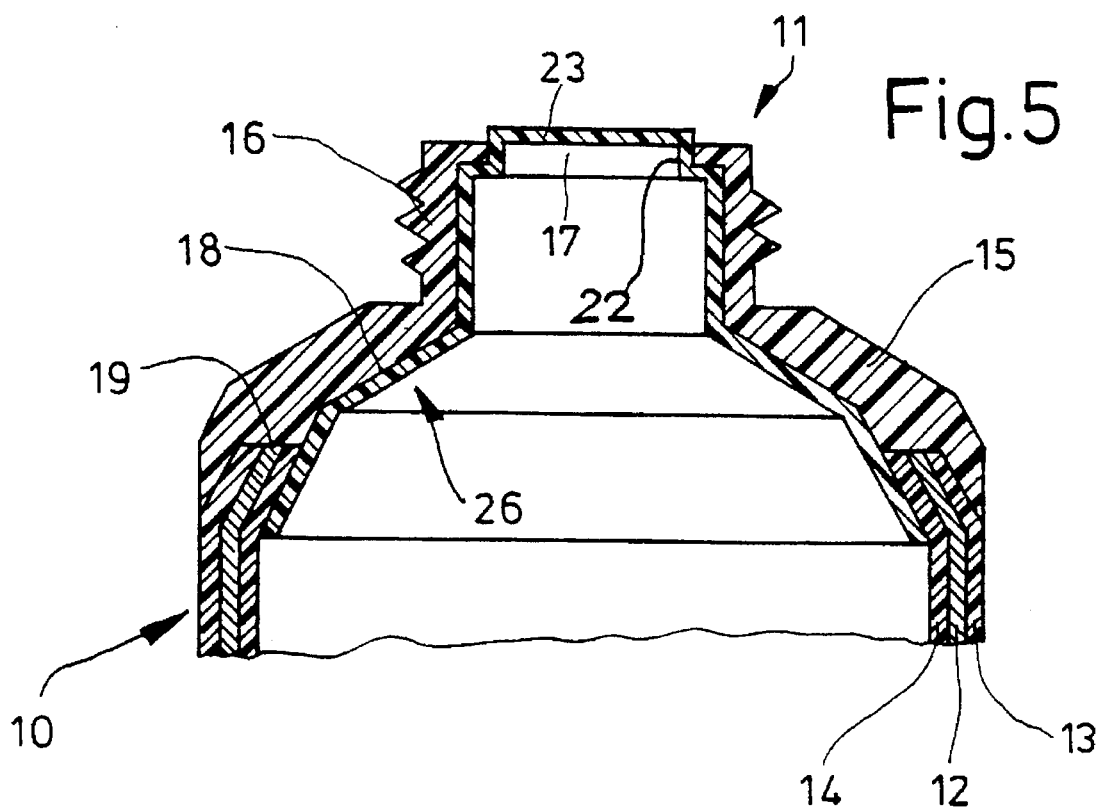
FIG. 5 shows a further configuration as illustrated in FIG. 4, in which the hollow-cylindrical extension portion engages through the discharge opening, closing same.

As shown in FIG. 5, the closure diaphragm 21 is redesigned in such a way that it carries a hollow-cylindrical extension portion 22 with a closure end portion 23, wherein the hollow-cylindrical extension portion 22 extends through the discharge opening 17 to such an extent that the surface of the closure end portion 23, which is towards the interior of the head 11, at least coincides with the outlet end of the discharge opening 17, in which respect a projecting portion of 2 to 3 mm relative to the outlet portion of the discharge opening 17 is advantageous for the purposes of more easily removing the closure end portion 23.

In the case of prefabricated tube heads 11, plates 18, plates 18 with a hollow-cylindrical extension portion 20, the latter in a one-piece configuration, in an advantageous development supplemented by the inclusion of the closure diaphragm 21 or the hollow-cylindrical extension portion 22 with closure end portion 23, may comprise EVAL or PETP, and can be glued into the tube heads.

When however the tube head is formed by injection or press moulding, while being joined at the same time to the tube body, it is preferred for all the above-mentioned diffusion-barrier means 26 to be made from the same laminate material as the tube body, at least on the other hand from a PE/EVAL or PE/PETP two-layer laminate, wherein a PE-laminate layer is to form the outer surface of the means 20, that is to say the surface which, after formation of the heads 11 by injection or press moulding, comes into engagement with the inner surface of the head 11, with the EVAL or PETP-layer forming the barrier to resist diffusion.

When a head 11 is shaped by injection or press moulding, multi-part tools comprising dies and punches (pressing mandrel) are used. The head sealing means according to the invention, with a PE-layer, are fitted in prefabricated form on to the punch and during the injection or pressing operation to form the head 11 and join same to the tube body 11, they are joined to the head by radiant or contact heat or outside heating, by fusing the PE-laminate layer thereto or thereon.

In the case where the tube end 19 is overlapped by the plate-shaped disc according to the invention, the inner PE-layer of the tube body 10 is also joined to the outer layer of the plate-shaped disc 18, which, in addition to a greater sealing effect, also results in an increase in the strength of the bond between the tube body 10 and the head 11.

The above-described preferred embodiment is not restricted to layers 13, 14 of polyethylene. It is also possible to use layers 13, 14 of polypropylene—without losing the surprising laminate effect—if tubes are to be formed for packaging materials which are to be sterilized. EVAL and PETP are preferred materials for the barrier layer 12, comparable effects can be achieved with materials of the same or similar molecular structure.

I claim:

1. A packaging tube comprising a tube body formed from a multilayer plastic laminate having a plastic diffusion barrier layer bonded on both sides to a layer of plastic material selected from the group consisting of polyethylene and polypropylene, the barrier layer and the plastic layers being bonded to each other using bonding agents, a tube head of plastic material connected by abutting and overlapping at least one end of the tube body, the tube head having a shoulder and a discharge portion and further having a diffusion barrier layer, said diffusion barrier layer being formed of a multiple ply plastic laminate comprising a layer of polyethylene or polypropylene and a barrier layer of plastic material, the plastic barrier layer of the tube body and the plastic barrier layer of the tube head each comprising a layer of ethylene-vinyl alcohol polymer or polyethylene terephthalate, the diffusion barrier of the head being arranged upon a side of the shoulder of the tube head facing the inside of the tube body, the means acting as a diffusion barrier extending at least from an end of the tube body as a first end to an entry orifice of said discharge portion as a second end and the plastic material layer of the tube body being attached to the tube head.

2. A packaging tube according to claim 1 wherein the means acting as a diffusion barrier is formed as a plate shaped disc.

3. A packaging tube according to claim 1 wherein the means forming the diffusion barrier is connected over its surface to the head.

4. A packaging tube according to claim 2 wherein the plate shaped disc projects overlappingly beyond the tube body end.

5. A packaging tube according to claim 2 wherein the plate shaped disc has a hollow cylindrical extension portion which is in engagement with the discharge portion.

6. A packaging tube according to claim 5 wherein the hollow cylindrical extension portion carries a closure diaphragm which covers an entry of a discharge opening.

7. A packaging tube according to claim 5 wherein the extension portion has a hollow cylindrical extension which passes through the discharge opening, with a closure end portion.

* * * * *